(12) United States Patent
Liao

(10) Patent No.: US 7,926,145 B2
(45) Date of Patent: Apr. 19, 2011

(54) SELECTIVELY LOCKABLE CASTER

(76) Inventor: Chaokuo Liao, Moorestown, NJ (US)

( * ) Notice: Subject to any disclaimer, the term of this patent is extended or adjusted under 35 U.S.C. 154(b) by 420 days.

(21) Appl. No.: 12/116,790

(22) Filed: May 7, 2008

(65) Prior Publication Data

US 2009/0276977 A1 Nov. 12, 2009

(51) Int. Cl.
*B60B 33/00* (2006.01)

(52) U.S. Cl. .......... 16/35 R; 16/18 R; 16/23; 16/29; 16/35 D; 188/1.12; 188/19

(58) Field of Classification Search .......... 16/18 R, 16/23, 29, 35 R, 35 D; 188/1.12, 19, 20
See application file for complete search history.

(56) References Cited

U.S. PATENT DOCUMENTS

| | | | | |
|---|---|---|---|---|
| 2,709,828 A * | 6/1955 | Noelting et al. | ........ | 16/35 R |
| 3,228,089 A * | 1/1966 | Turner | ........ | 29/898.066 |
| 3,571,842 A | 3/1971 | Fricke | | |
| 3,828,392 A * | 8/1974 | Bolger | ........ | 16/35 R |
| 3,881,216 A * | 5/1975 | Fontana | ........ | 16/35 R |
| 3,890,669 A * | 6/1975 | Reinhards | ........ | 16/35 R |
| 4,035,864 A | 7/1977 | Schröder | | |
| 4,205,413 A | 6/1980 | Collignon et al. | | |
| 4,349,937 A | 9/1982 | Fontana | | |
| 4,835,815 A | 6/1989 | Mellwig et al. | | |
| 6,725,501 B2 | 4/2004 | Harris et al. | | |
| 6,810,560 B1 * | 11/2004 | Tsai | ........ | 16/35 R |
| 2004/0020008 A1 * | 2/2004 | Harris et al. | ........ | 16/35 R |
| 2004/0194221 A1 * | 10/2004 | Thompson et al. | ........ | 5/720 |
| 2006/0236501 A1 * | 10/2006 | Chou | ........ | 16/35 R |
| 2007/0056141 A1 * | 3/2007 | Armano et al. | ........ | 16/35 R |

* cited by examiner

*Primary Examiner* — Shane Bomar
*Assistant Examiner* — Roberta Delisle
(74) *Attorney, Agent, or Firm* — Foley & Lardner LLP

(57) ABSTRACT

A selectively lockable caster with total locking (wheel brake and swivel lock) as well as directional locking (tracking) functions. A separate lock tooth for each locking function is adapted to engage certain differently configured lock recesses. Specifically, a total lock tooth, which is part of a mechanism that also applies a brake to the wheel, is configured to engage any of the total lock recesses and any of the directional lock recesses to lock the wheel against pivotal movement about the swivel axis in any of a plurality of total lock positions. A directional lock tooth is configured to engage only the directional lock recesses to lock the yoke against pivotal movement about the swivel axis in at least one directional lock (tracking) position while allowing the wheel to rotate.

19 Claims, 8 Drawing Sheets

SELECTIVELY LOCKABLE CASTER

TECHNICAL FIELD

The invention relates generally to the field of casters for movably supporting objects and, in particular, casters that can be locked to prevent the caster wheel from rotating about its running axis (wheel braking) and/or from turning about its swivel axis.

BACKGROUND ART

A swivel lock for a caster helps to maintain directional control (tracking) of an object that it supports, such as a cart, while the object is being moved. A wheel brake keeps the supported object from rolling unintentionally. Total locking of the caster (wheel brake and swivel lock) is the most stable condition, preventing all rolling and swiveling movement. Examples of both are disclosed in U.S. Pat. No. 4,035,864; U.S. Pat. No. 4,835,815; U.S. Pat. No. 4,205,413; U.S. Pat. No. 3,571,842; U.S. Pat. No. 4,349,937; and U.S. Pat. No. 6,725,501, to name a few.

SUMMARY DISCLOSURE OF THE INVENTION

The present invention is directed to a unique and improved caster having directional and total locking capabilities. From one perspective, the invention is directed to a lockable caster comprising a mounting member adapted to be connected to a load to be supported by the caster; a yoke, comprising two depending legs interconnected by an upper bight portion, pivotally connected to the mounting member for relative pivotal movement about a swivel axis; a wheel mounted between the legs of the yoke for rotation about a running axis; and a locking structure between the legs of the yoke adjacent the bight portion and fixed relative to the mounting member. The locking structure comprises recesses spaced so as to at least partially surround the swivel axis. A total lock mechanism is carried by the yoke and comprises a movable brake member adapted to engage the wheel to lock it against rotation, and a movable total lock tooth configured to engage any of a plurality of the recesses to lock the yoke against pivotal movement about the swivel axis in any of a plurality of total lock positions. A directional lock mechanism is carried by the yoke and comprises a movable directional lock tooth adapted to engage at least one of the recesses to lock the yoke against pivotal movement about the swivel axis in at least one directional lock (tracking) position while allowing the wheel to rotate. The number of directional lock positions is fewer than the number of total lock positions.

In a preferred arrangement, all of the recesses may be coplanar, and all may lie along a circle centered on the swivel axis. For example, the locking structure may comprise a lower ball retainer of a pivot bearing assembly, and the recesses may be located at the periphery of the lower ball retainer. The directional lock tooth preferably is wider than the total lock tooth; at least one of the recesses is a directional lock recess having a width sized to accommodate the directional lock tooth; and the other recesses are equal-width total lock recesses that are equally spaced on either side of the directional lock recess(es) and are sized to accommodate the total lock tooth but not the directional lock tooth. The number of recesses engageable by the directional lock tooth preferably is fewer than the number of recesses engageable by the total lock tooth. Further, the total lock tooth preferably comprises at least two tines spaced such that each tine can engage a total lock recess, the overall width of the plurality of tines being equal to the width of the directional lock tooth so that the total lock tooth can also engage a directional lock recess. Preferably there are two diametrically opposed directional lock recesses.

The total lock mechanism preferably comprises a total lock lever pivoted intermediate its ends to the yoke, with the brake member and the total lock tooth at opposite ends of the total lock lever. The directional lock mechanism preferably comprises a directional lock lever pivoted intermediate its ends to the yoke, with the directional lock tooth at one end of the directional lock lever. The total lock lever and the directional lock lever preferably are arranged side-by-side, with both pivoted to the yoke about a common pivot axis. The brake member preferably is canted toward the medial plane of the wheel so as to be engageable with the outer circumference of the wheel.

Each of the lock mechanisms preferably is spring-biased away from a locked state and comprises an expanding over-center toggle mechanism pivoted to the yoke for moving the lock mechanism against the spring bias into a locked state. Each toggle mechanism preferably comprises a four-bar linkage, one link of the toggle mechanism being pivoted to its respective lock lever remote from its toothed end and having an extension forming an operating pedal for moving the lock mechanism into a locked state. The operating pedals of the toggle mechanisms preferably are arranged side-by-side, with a common release pedal pivoted to the yoke above the operating pedals and linked to each toggle mechanism for releasing either or both of the lock mechanisms from a locked state.

From another perspective, the invention is directed to a lockable caster comprising a mounting member adapted to be connected to a load to be supported by the caster; a yoke, comprising two depending legs interconnected by an upper bight portion, pivotally connected to the mounting member for relative pivotal movement about a swivel axis; a wheel mounted between the legs of the yoke for rotation about a running axis; and a locking structure between the legs of the yoke adjacent the bight portion and fixed relative to the mounting member. The locking structure preferably comprises coplanar recesses spaced along a circle centered on the swivel axis, at least one of the recesses being a directional lock recess, and a greater number of other recesses being total lock recesses, which are configured differently from the directional lock recess. A total lock mechanism carried by the yoke comprises a movable brake member configured to engage the wheel to lock it against rotation, and a movable total lock tooth configured to engage any of the total lock recesses and any of the directional lock recesses to lock the yoke against pivotal movement about the swivel axis in any of a plurality of total lock positions. A directional lock mechanism is carried by the yoke and comprises a movable directional lock tooth configured to engage only the directional lock recesses to lock the yoke against pivotal movement about the swivel axis in at least one directional lock (tracking) position while allowing the wheel to rotate.

In a preferred arrangement, the total lock tooth is at one end of a total lock lever, and the directional lock tooth is at one end of a directional lock lever. The two lock levers preferably are arranged side-by-side with their toothed ends adjacent each other.

Further features, aspects and advantages of the invention will become apparent from the following detailed description of preferred embodiments, including the best mode for carrying out the invention, when considered together with the accompanying figures of drawing.

DETAILED DESCRIPTION

Figure 1:
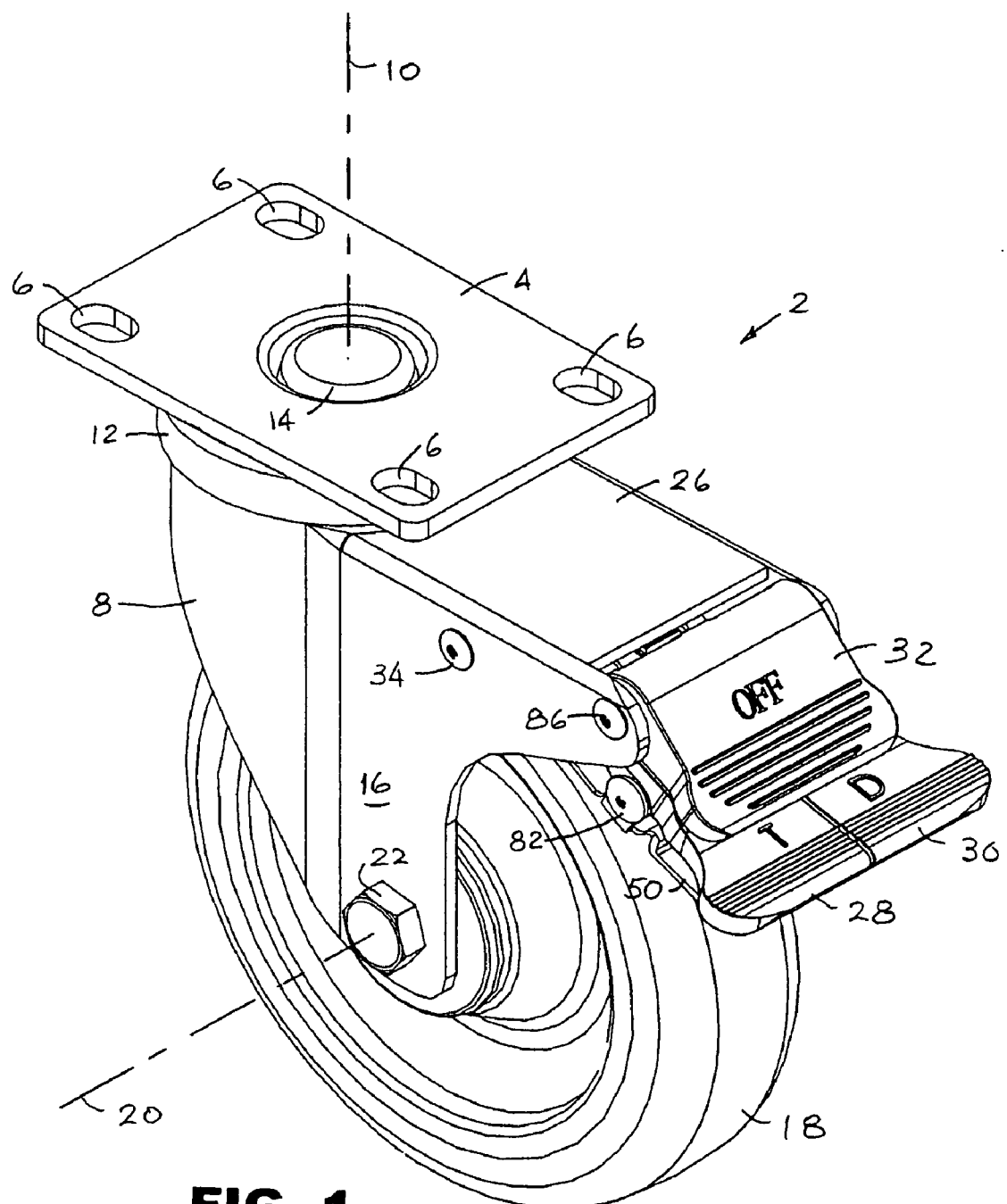
FIG. 1 is a perspective view of one example of a locking caster according to the invention.
Figure 2:
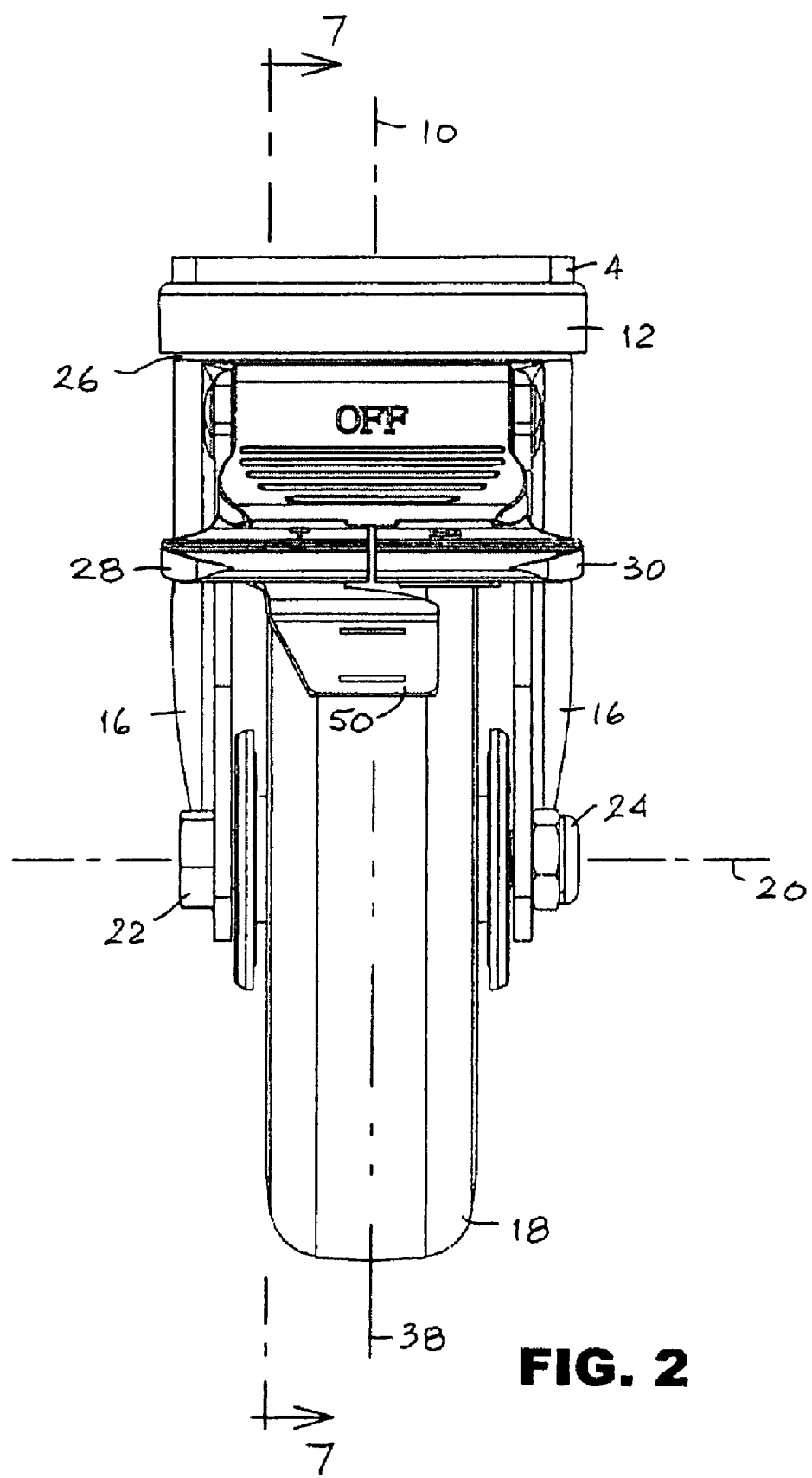
FIG. 2 is a front elevational view of the caster of FIG. 1.
Figure 3:
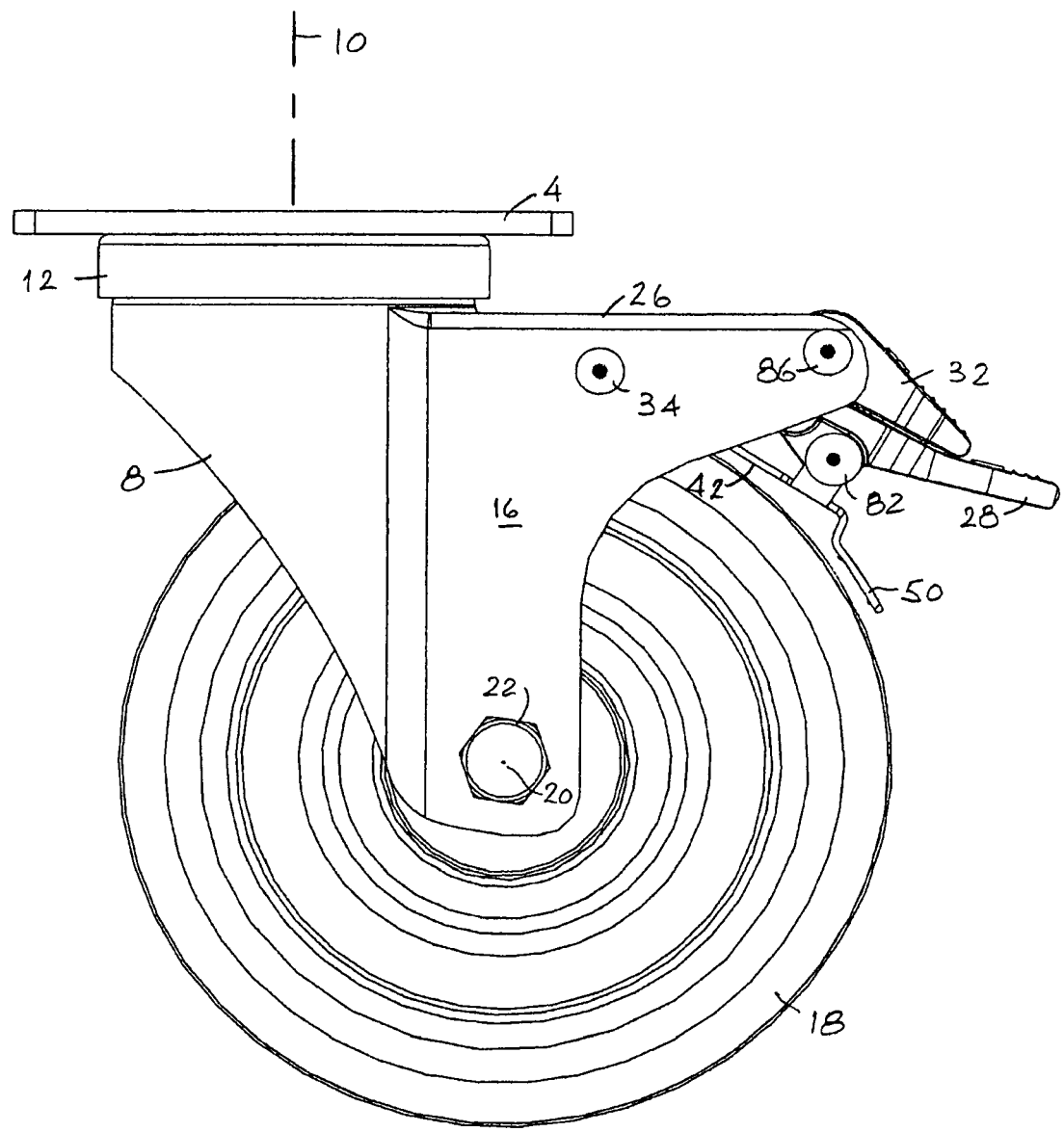
FIG. 3 is a left side elevational view of the caster of FIG. 1.
Figure 4:
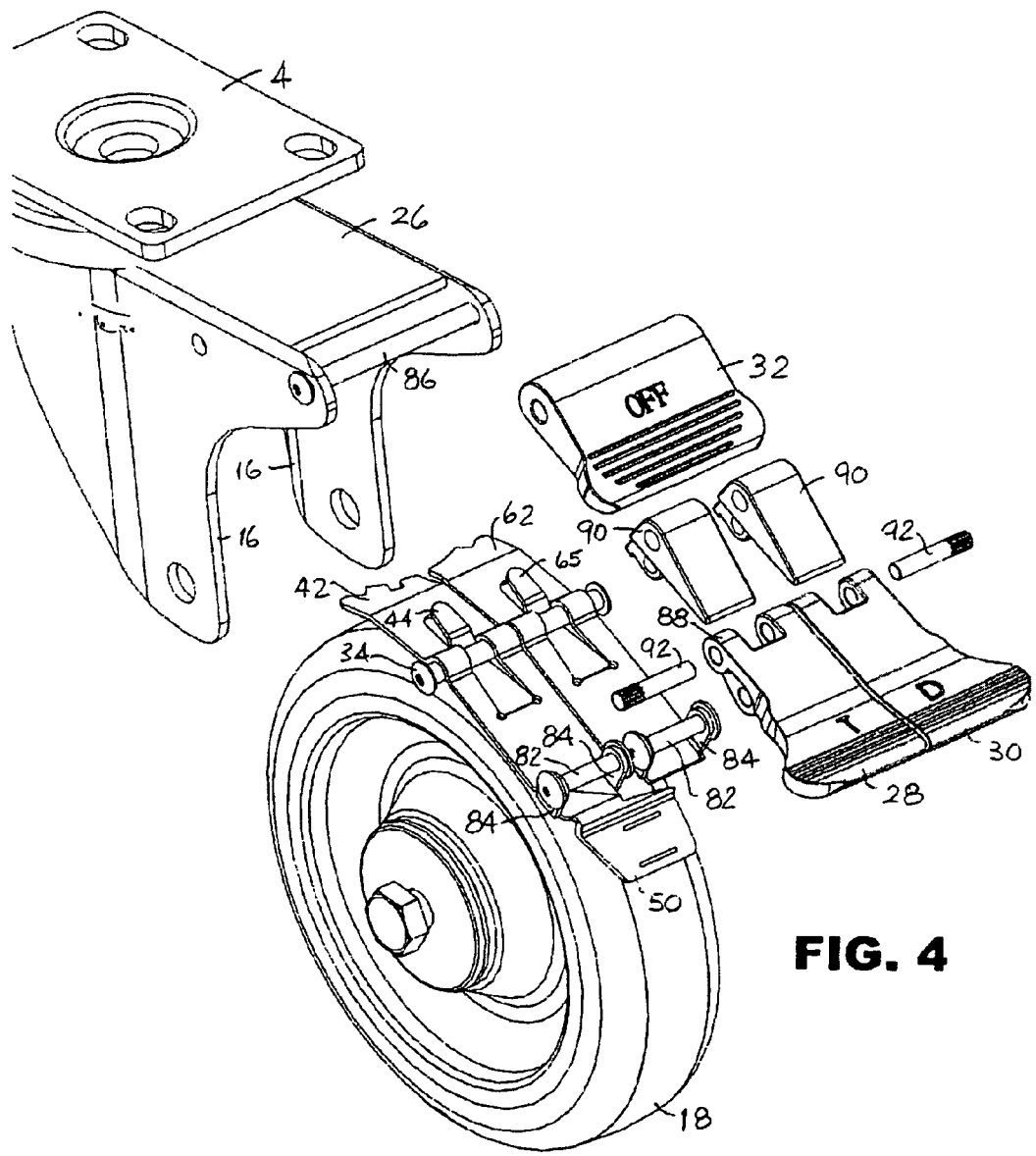
FIG. 4 is an exploded view of the caster of FIG. 1, showing details of the lock mechanisms.
Figure 5:
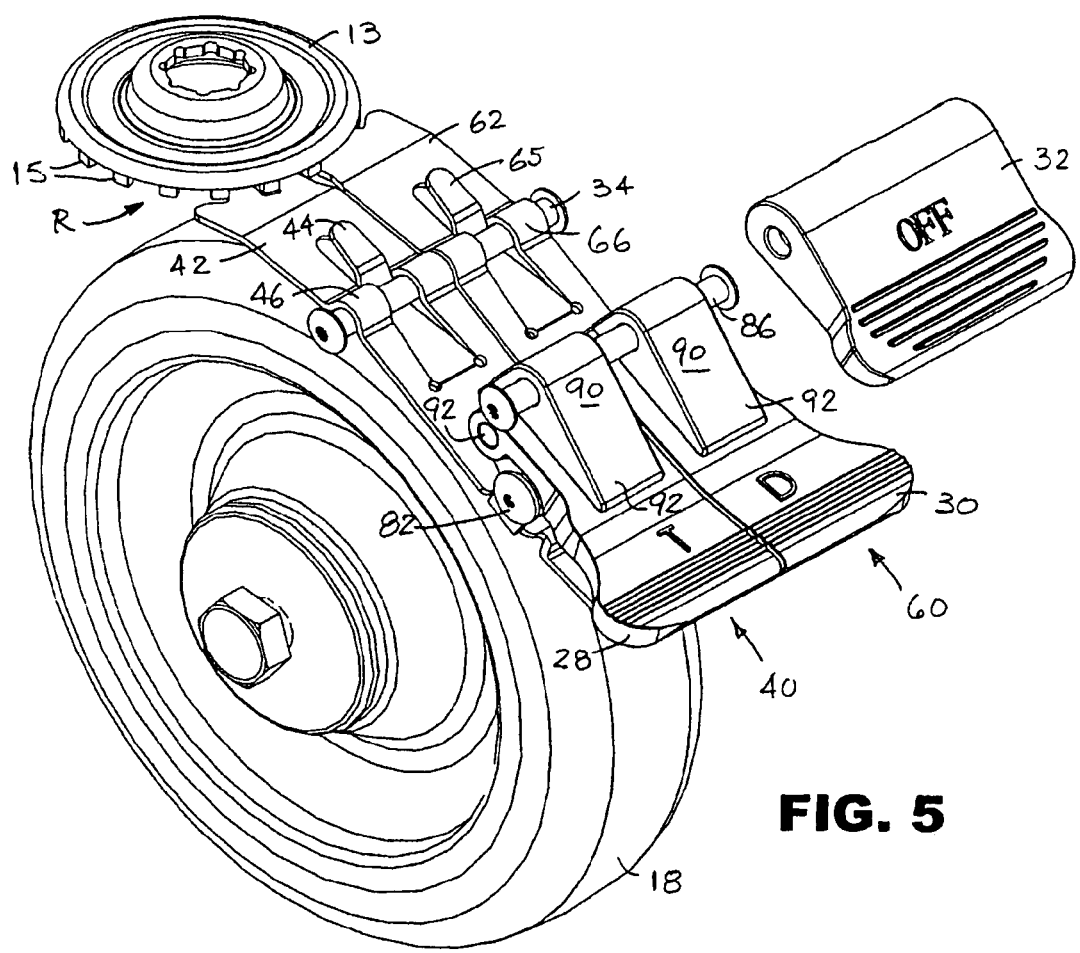
FIG. 5 is a partially exploded perspective view of the caster of FIG. 1, with some parts removed, showing how the lock mechanisms interface with the lock recesses.
Figure 6:
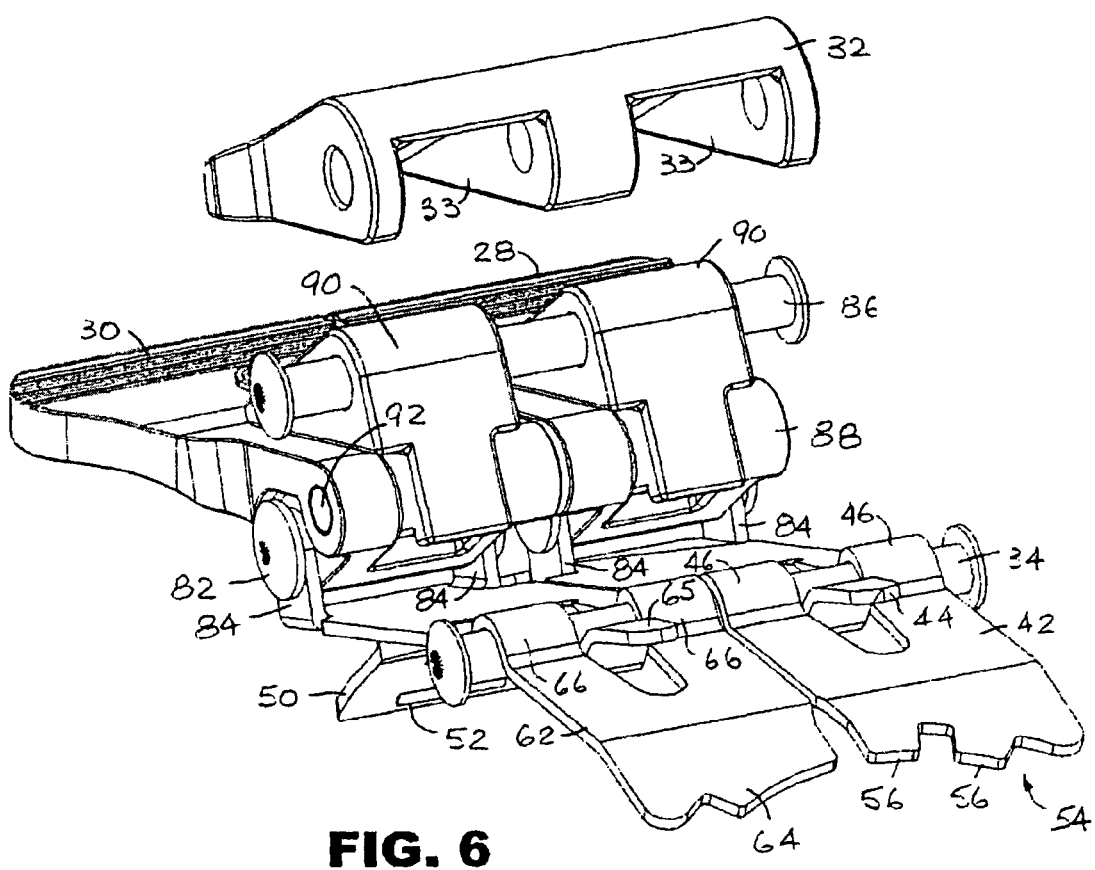
FIG. 6 is a partially exploded perspective view of the lock mechanisms of the caster of FIG. 1, from an opposite viewpoint.

Referring to FIGS. 1-3, a locking caster 2 according to the invention comprises a mounting member in the form of a plate 4 having four elongated holes 6 through which bolts, screws or other suitable fasteners can be installed to attach the caster to a load to be movably supported. A yoke 8 is connected to the plate 4 for relative pivotal movement about a swivel axis 10 by means of a pivot bearing assembly 12 and a rivet 14 or other suitable fastener. The yoke has depending legs 16 between which a ground-engaging wheel 18 is mounted for rotation about a running axis 20 by means of an axle 22, which extends through aligned holes in the legs 16 and through bearings in the wheel, secured by a locknut 24. The legs 16 are interconnected by an upper bight portion 26. Also visible in these figures are a total lock operating pedal 28, a directional lock operating pedal 30, and a common release pedal 32, all of which are parts of the lock mechanisms described below.

Figure 7:
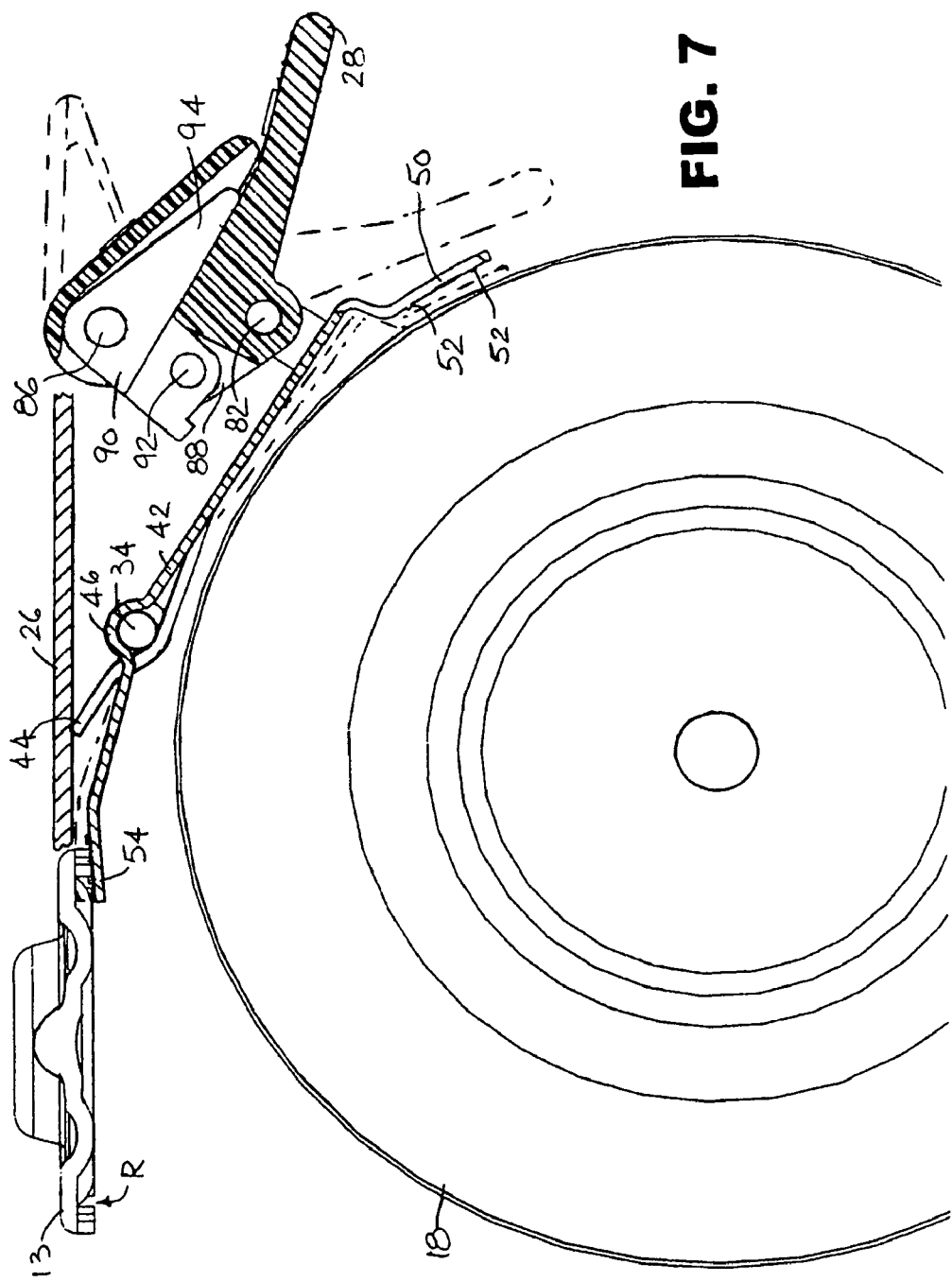
FIG. 7 is a cross-sectional view taken along line 7-7 in FIG. 2, with most of the yoke removed, showing the relationship among the total lock mechanism, the lock recesses and the wheel.

Referring to FIGS. 4-8, two side-by-side lock mechanisms 40, 60 are carried by the yoke 8 and are selectively engageable with various recesses R formed by and between teeth 15 on the lower ball retainer 13 of pivot bearing assembly 12. Lower ball retainer 13 is fixed relative to plate 4. Teeth 15 and recesses R thus form a locking structure that is fixed (stationary) in relation to plate 4. One of the lock mechanisms is a total lock mechanism 40, which comprises a total lock lever 42 pivoted intermediate its ends to the yoke 8 about a pivot rod 34, which is secured to the legs 16 through holes 36. Lever 42 preferably is made of spring steel and has a projecting central tab 44, which is flanked by curved shoulders 46. Resilient tab 44 and shoulders 46 embrace pivot rod 34, with the tip of tab 44 trapped against the underside of bight portion 26 (see FIG. 7) to bias total lock lever 42 toward an unlocked position (counterclockwise as seen in FIG. 7). Although shown passing beneath pivot rod 34, for easier assembly tab 44 alternatively could be configured to pass above rod 34 and still perform its biasing function.

The front (lower) end of lock lever 42 has a brake member 50 that is canted toward the medial plane 38 of the wheel 18 so as to overlie the center of the wheel tread. Brake member 50 has braking elements on its underside in the form of ribs 52 that grip the wheel tread when in a locked condition. Other types of braking elements or surfaces may be employed, depending at least in part on the type of wheel tread used. The opposite (rear) end of total lock lever 42 has a total lock tooth structure 54 in the form of two tines 56 shaped and arranged along an arc that conforms to the arc along which teeth 15 of lower ball retainer 13 are arranged.

The other lock mechanism is a directional lock mechanism 60, which comprises a directional lock lever 62 that is similar in many respects to total lock lever 42. Directional lock lever 62 also preferably is made of spring steel, is pivoted intermediate its ends to the yoke 8 about pivot rod 34, and has a projecting central tab 65, which is flanked by curved shoulders 66. Resilient tab 65 and shoulders 66 embrace pivot rod 34, with the tip of tab 65 trapped against the underside of bight portion 26 to bias directional lock lever 62 toward an unlocked position (counterclockwise with reference to FIG. 7). Although shown passing beneath pivot rod 34, for easier assembly tab 65 alternatively could be configured to pass above rod 34 and still perform its biasing function. The rear end of directional lock lever 62 has a directional lock tooth structure in the form of a single tooth 64 shaped and arranged along an arc that conforms to the arc along which teeth 15 of lower ball retainer 13 are arranged.

Figure 8:
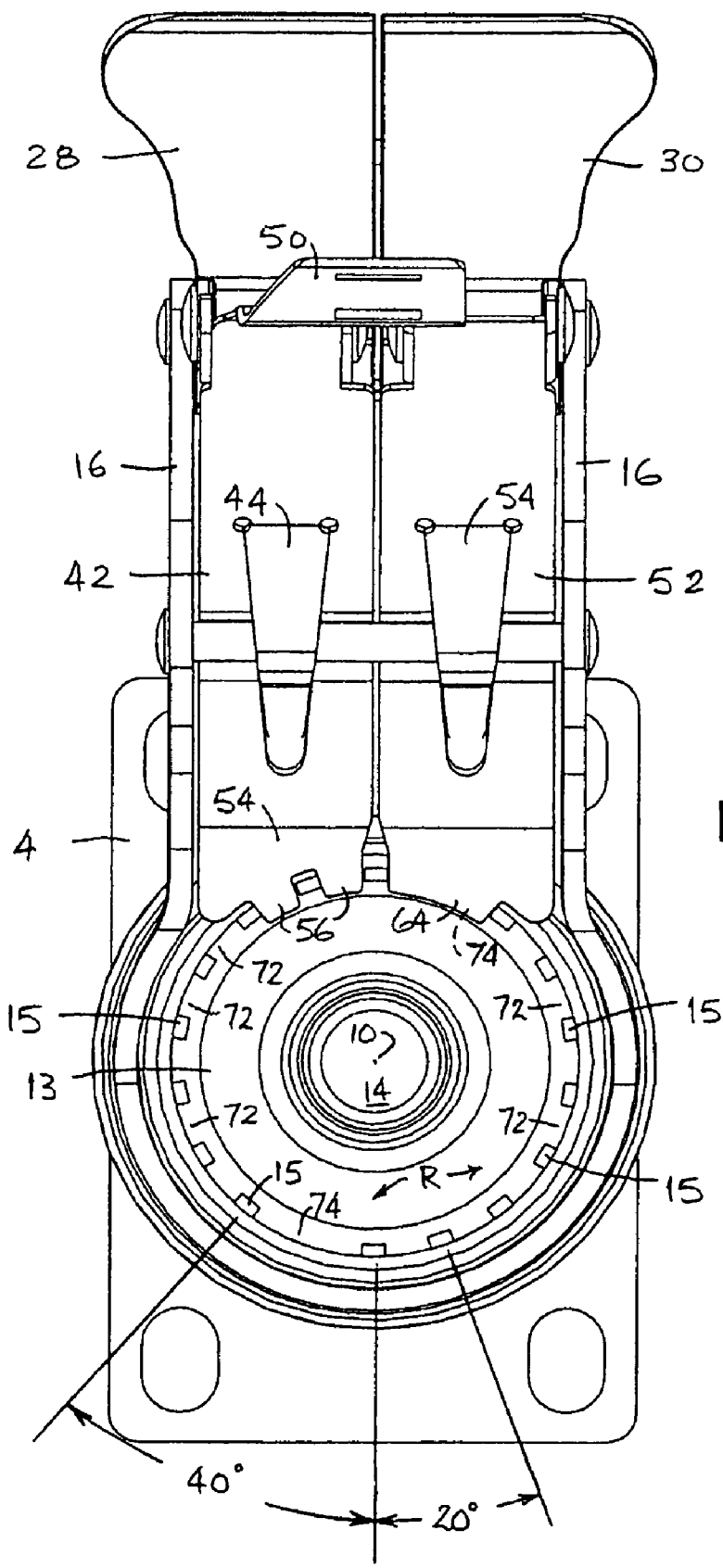
FIG. 8 is a bottom plan view of the caster of FIG. 1, with the wheel removed, showing the relationship of the lock mechanisms to the lock recesses.

Referring to FIG. 8, the swivel locking relationship that involves recesses R on lower ball retainer 13, directional lock tooth 64 and total lock tooth 54 (tines 56) will now be explained. The recesses R on lower ball retainer 13 are of two different sizes, all formed by teeth 15: fourteen narrow, equal-width total lock recesses 72, and two wider, equal-width and diametrically opposed directional lock recesses 74. All are arranged in a circle centered on swivel axis 10. Total lock recesses 72 are equally spaced on either side of each of the directional lock recesses 74. The angular offsets of adjacent teeth 15 are as follows:

| teeth 15 that form total lock recesses 72: | 20 degrees; |
|---|---|
| teeth 15 that form directional lock recesses 74: | 40 degrees. |

Thus, the space between alternate teeth 15 that form the total lock recesses 72 is equal to the width of each directional lock recess.

Directional lock tooth 64 is sized to fit into (engage) only a directional lock recess 74; it is too wide to engage any total lock recess 72. The tines 56 of total lock tooth 54 are sized and spaced to fit into (engage) any adjacent pair of total lock recesses 72; or one tine 56 can engage a single total lock recess 72 adjacent a directional lock recess 74, with the other tine residing in that directional lock recess 74. The pair of tines 56 together have an overall width that is equal to the width of the directional lock tooth 64; therefore, the total lock tooth 54 can also fit into (engage) either of the directional lock recesses 74. Accordingly, total locking can be effected in any of eighteen swivel positions, equally spaced by 20 degrees. On the other hand, directional locking in a tracking position can be effected in only two swivel positions (with the directional lock tooth 64 engaging a directional lock recesses 74); and because those positions are diametrically opposed, the plane of rotation of the wheel 18 when so locked is the same regardless of which directional lock recess 74 is engaged.

Upward (locking) movement of the rear toothed end of each of the lock levers 42, 62 to engage recesses R is effected through separate but similar expanding toggle mechanisms, each comprising a four-bar, over-center linkage. Depressing common release pedal 32 (labeled "OFF") unlocks either or both of the lock mechanisms, i.e., lowers the toothed end(s) of the lock lever(s) out of engagement with recesses R. Both toggle mechanisms are pivotally linked to the legs 16 of the yoke by a common pivot rod 86, about which common release pedal 32 also pivots. Each toggle mechanism includes its respective lock lever 42, 62, which is pivotally linked by an individual pivot pin 82 held in a pair of upturned ears 84 at the front (lower) end of the lock lever. Each toggle mechanism further includes the rear extension 88 of its respective lock operating pedal 28, 30, and a cam link 90 individually linked to its respective pedal extension by a pivot pin 92 and nestled in a recess 33 in common release pedal 32. The upper end of cam link 90 is pivoted to the legs 16 by common pivot rod 86. Thus, the four "bars" of each linkage are: the yoke 8 (leg(s) 16); the lock lever (42, 62) from pivot rod 34 to pivot pin 82; the rear extension 88 of the lock operating pedal (28, 30) from pivot pin 82 to pivot pin 92; and the cam link 90 from pivot pin 92 to pivot rod 86.

The sectional view of FIG. 7 shows in broken lines the locked positions of the components of one of the lock mechanisms. When the lock operating pedal (28, 30) is depressed, the rear extension 88 of the lock operating pedal and the cam link 90 expand the distance between pivot rod 86 and pivot pin 82, forcing the front end of the lock lever (42, 62) downwardly so that the lock lever pivots about pivot rod 34, raising the opposite (rear) end of the lock lever toward the lower ball retainer 13 and its recesses R. The lock operating pedal rear extension 88 and the cam link 90 are dimensioned such that an over-center latching effect is achieved, whereby the lock operating pedal (28, 30) snaps downwardly near the end of its travel and remains there. At the same time, a front extension 94 on cam link 90 raises common release pedal 32. When the common release pedal 32 is in this position and is depressed, it forces the cam link 90 to rotate downwardly, raising the front end of the lock lever (42, 62), lowering the opposite (rear) end away from the lower ball retainer 13 and its recesses R, and raising the lock operating pedal (28, 30).

When the total lock operating pedal 28 is depressed, if the tines 56 of resilient total lock lever 42 are not aligned with any of the recesses 72, 74, slight pivoting of the yoke and wheel (less than 20 degrees) about the swivel axis 10 will allow them to snap into engagement with one or more nearby recesses to effect total locking. When the directional lock operating pedal 30 is depressed, if the tooth 64 of the resilient directional lock lever 62 is not aligned with a directional lock recess 74, pivoting of the yoke and wheel by less than 180 degrees about the swivel axis 10 will allow tooth 64 to snap into engagement with one of the directional lock recesses 74 to effect directional locking. Of course, if the yoke and wheel are pivoted in a direction that moves the tooth 64 toward the nearer directional lock recess 74, locking will be accomplished by swiveling the yoke and wheel less than 90 degrees.

The above-described arrangement of recesses R on stationary lower ball retainer 13 is exemplary only, and it is envisioned that the invention may encompass many variants. For example, it may be desirable to be able to lock the wheel directionally in one of two (or even more) planes of rotation (tracking positions), in which case an additional pair of diametrically opposed directional lock recesses 74 may be formed on lower ball retainer 13, e.g., displaced 90 degrees from the first pair. Alternatively, instead of forming the directional lock recesses in diametrically opposed pairs, individual directional lock recesses 74 may be formed at positions on lower ball retainer 13 that are not diametrically opposed to one another. Further, a different number of total lock recesses 72 may be formed on lower ball retainer 13, depending on the size of the caster and/or the requirements of the particular caster application, the sizes of the recesses and the lock teeth being adjusted accordingly. In a further variant, the recesses may be formed on a stationary plate fixed below and coaxial with lower ball retainer 13, instead of on the lower ball retainer. In almost any variant, the recesses themselves may be formed as depressions or holes rather than being defined by the square shoulders of teeth such as those on lower ball retainer 13. Of course, in that case, the lock teeth 54, 64 would have to be configured appropriately to engage such recesses.

It is also possible, within the scope of the invention, to deviate from the exclusively coplanar arrangement of recesses R described above. For example, two sets of recesses in spaced parallel planes may be employed: one set (e.g., the total lock recesses) formed at the periphery of stationary lower ball retainer 13, and the other set (the directional lock recess(es)) formed along a circle on a stationary plate fixed below and coaxial with lower ball retainer 13, or along a smaller circle on lower ball retainer 13. With such arrangements, the directional lock lever would be differently configured so as to reach the differently placed directional lock recess(es) and clear the total lock recesses. The locations of the different sets of recesses could be reversed, in which case the total lock lever would be differently configured for reach and clearance. Those skilled in the art will recognize that further variations are within the scope of the invention, which is defined by the appended claims.

As to material selection, it is preferred that most of the parts of the caster of the invention be made of steel (e.g., stainless) for strength and durability. Possible exceptions are the pedals 28, 30, 32 and the cam links 90, which preferably are molded of a stiff and durable plastic, such as HDPE. The wheel and its bearings may be made of any materials suitable for the particular application. Of course, material selection for any of the parts of the caster will be governed at least in part by particular load, environmental and regulatory requirements of the application.

INDUSTRIAL APPLICABILITY

It will be readily apparent that selectively lockable casters embodying the invention can be employed to movably support a wide variety of objects and structures used in many fields, such as food service carts, equipment carts, utility carts, dollies, and patient beds, to name just a few.

The invention claimed is:
1. A lockable caster comprising:
a mounting member adapted to be connected to a load to be supported by the caster;
a yoke pivotally connected to the mounting member for relative pivotal movement about a swivel axis, the yoke comprising two depending legs interconnected by an upper bight portion;
a wheel mounted between the legs of the yoke for rotation about a running axis;
a locking structure between the legs of the yoke adjacent the bight portion and fixed relative to the mounting member, the locking structure comprising recesses spaced so as to at least partially surround the swivel axis;
a total lock mechanism carried by the yoke, comprising a movable brake member adapted to engage the wheel to lock it against rotation, and a movable total lock tooth configured to engage any of a plurality of the recesses to lock the yoke against pivotal movement about the swivel axis in any of a plurality of total lock positions; and
a directional lock mechanism carried by the yoke and comprising a movable directional lock tooth adapted to engage at least one of the recesses to lock the yoke against pivotal movement about the swivel axis in at least one directional lock position while allowing the wheel to rotate, the number of directional lock positions being fewer than the number of total lock positions, wherein the number of recesses engageable by the directional lock tooth is fewer than the number of recesses engageable by the total lock tooth.

2. A lockable caster according to claim 1, wherein all of the recesses are coplanar.

3. A lockable caster according to claim 2, wherein all of the recesses lie along a circle centered on the swivel axis.

4. A lockable caster according to claim 3, wherein:
the directional lock tooth is wider than the total lock tooth;
at least one of the recesses is a directional lock recess having a width sized to accommodate the directional lock tooth; and
the other recesses are equal-width total lock recesses that are equally spaced on either side of the at least one directional lock recess and are sized to accommodate the total lock tooth but not the directional lock tooth.

5. A lockable caster according to claim 4, wherein the total lock tooth comprises a plurality of tines spaced such that each tine can engage a total lock recess, the overall width of the plurality of tines being equal to the width of the directional lock tooth so that the total lock tooth can engage a directional lock recess.

6. A lockable caster according to claim 5, wherein the total lock tooth comprises two tines.

7. A lockable caster according to claim 5, wherein said at least one directional lock recess comprises two diametrically opposed directional lock recesses.

8. A lockable caster according to claim 1, wherein the locking structure comprises a lower ball retainer of a pivot bearing assembly, and a plurality of the recesses are located at the periphery of the lower ball retainer.

9. A lockable caster according to claim 1, wherein the total lock mechanism comprises a total lock lever pivoted intermediate its ends to the yoke, and the brake member and the total lock tooth are at opposite ends of the total lock lever.

10. A lockable caster according to claim 9, wherein the directional lock mechanism comprises a directional lock lever pivoted intermediate its ends to the yoke, and the directional lock tooth is at one end of the directional lock lever.

11. A lockable caster, comprising:
a mounting member adapted to be connected to a load to be supported by the caster;
a yoke pivotally connected to the mounting member for relative pivotal movement about a swivel axis, the yoke comprising two depending legs interconnected by an upper bight portion;
a wheel mounted between the legs of the yoke for rotation about a running axis;
a locking structure between the legs of the yoke adjacent the bight portion and fixed relative to the mounting member, the locking structure comprising recesses spaced so as to at least partially surround the swivel axis;
a total lock mechanism carried by the yoke, comprising a movable brake member adapted to engage the wheel to lock it against rotation, and a movable total lock tooth configured to engage any of a plurality of the recesses to lock the yoke against pivotal movement about the swivel axis in any of a plurality of total lock positions; and
a directional lock mechanism carried by the yoke and comprising a movable directional lock tooth adapted to engage at least one of the recesses to lock the yoke against pivotal movement about the swivel axis in at least one directional lock position while allowing the wheel to rotate, the number of directional lock positions being fewer than the number of total lock positions, wherein the total lock mechanism comprises a total lock lever pivoted intermediate its ends to the yoke, and the brake member and the total lock tooth are at opposite ends of the total lock lever, wherein the directional lock mechanism comprises a directional lock lever pivoted intermediate its ends to the yoke, and the directional lock tooth is at one end of the directional lock lever, and wherein the total lock lever and the directional lock lever are arranged side-by-side.

12. A lockable caster according to claim 11, wherein the wheel has a medial plane perpendicular to the running axis, and the brake member is canted toward the medial plane so as to be engageable with the outer circumference of the wheel.

13. A lockable caster according to claim 11, wherein the total lock lever and the directional lock lever are pivoted to the yoke about a common pivot axis.

14. A lockable caster according to claim 13, wherein each of the lock mechanisms is spring-biased away from a locked state and comprises an expanding over-center toggle mechanism pivoted to the yoke for moving the lock mechanism against the spring bias into a locked state.

15. A lockable caster according to claim 14, wherein each toggle mechanism comprises a four-bar linkage, one link of the toggle mechanism being pivoted to its respective lock lever remote from the toothed end thereof and having an extension forming an operating pedal for moving the lock mechanism into a locked state.

16. A lockable caster according to claim 15, wherein the operating pedals of the toggle mechanisms are arranged side-by-side.

17. A lockable caster according to claim 16, further comprising a common release pedal pivoted to the yoke above the operating pedals and linked to each toggle mechanism for releasing either or both of the lock mechanisms from a locked state.

18. A lockable caster comprising:
a mounting member adapted to be connected to a load to be supported by the caster;
a yoke pivotally connected to the mounting member for relative pivotal movement about a swivel axis, the yoke comprising two depending legs interconnected by an upper bight portion;
a wheel mounted between the legs of the yoke for rotation about a running axis;
a locking structure between the legs of the yoke adjacent the bight portion and fixed relative to the mounting member, the locking structure comprising coplanar recesses spaced along a circle centered on the swivel axis, at least one of the recesses being a directional lock recess, and a greater number of other recesses being total lock recesses, which are configured differently from the at least one directional lock recess;
a total lock mechanism carried by the yoke, comprising a movable brake member configured to engage the wheel to lock it against rotation, and a movable total lock tooth configured to engage any of the total lock recesses and any of the directional lock recesses to lock the yoke against pivotal movement about the swivel axis in any of a plurality of total lock positions; and
a directional lock mechanism carried by the yoke, comprising a movable directional lock tooth configured to engage only the directional lock recesses to lock the yoke against pivotal movement about the swivel axis in at least one directional lock position while allowing the wheel to rotate, wherein the total lock mechanism comprises a total lock lever pivoted intermediate its ends to the yoke, and the brake member and the total lock tooth are at opposite ends of the total lock lever, wherein the directional lock mechanism comprises a directional lock lever pivoted intermediate its ends to the yoke, and the directional lock tooth is at one end of the directional lock lever, and wherein the total lock lever and the directional lock lever are pivoted to the yoke about a common pivot axis and are arranged side-by-side with their toothed ends adjacent each other.

19. A lockable caster according to claim 18, wherein the wheel has a medial plane perpendicular to the running axis, and the brake member is canted toward the medial plane so as to be engageable with the outer circumference of the wheel.

\* \* \* \* \*